United States Patent
Prasky et al.

(10) Patent No.: US 8,966,186 B2
(45) Date of Patent: *Feb. 24, 2015

(54) CACHE MEMORY PREFETCHING

(71) Applicant: International Business Machines Corporation, Armonk, NY (US)

(72) Inventors: Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,194

(22) Filed: Nov. 22, 2013

(65) Prior Publication Data

US 2014/0082287 A1 Mar. 20, 2014

Related U.S. Application Data

(63) Continuation of application No. 13/523,589, filed on Jun. 14, 2012.

(51) Int. Cl.
*G06F 12/08* (2006.01)

(52) U.S. Cl.
CPC ........ *G06F 12/0862* (2013.01); *G06F 12/0811* (2013.01); *G06F 12/0897* (2013.01); *G06F 2212/6024* (2013.01)
USPC .......................................................... 711/137

(58) Field of Classification Search
CPC .................................................. G06F 12/0862
USPC ......................................... 711/113, 118–146
See application file for complete search history.

(56) References Cited

U.S. PATENT DOCUMENTS

| | | | |
|---|---|---|---|
| 6,516,389 B1 | 2/2003 | Uchihori | |
| 6,535,961 B2 | 3/2003 | Wilkerson et al. | |
| 6,557,080 B1 * | 4/2003 | Burger et al. | 711/137 |
| 6,684,294 B1 * | 1/2004 | Huffman | 711/112 |

(Continued)

OTHER PUBLICATIONS

Jiang, Song; Ding, Xlaoning; Chen, Feng; Tan, Enhua; Zhang, Xiaodong. "DULO: An Effective Buffer Cache Management Scheme to Exploit Both Temporal and Spatial Locality." USENIX Association. FAST '05': 4th USENIX Conference on File and Storage Technologies. pp. 101-114.*

(Continued)

*Primary Examiner* — Alexander Sofocleous
*Assistant Examiner* — Mikka Liu
(74) *Attorney, Agent, or Firm* — Cantor Colburn LLP; Margaret McNamara

(57) ABSTRACT

According to exemplary embodiments, a computer program product, system, and method for prefetching in memory include determining a missed access request for a first line in a first cache level and accessing an entry in a prefetch table, wherein the entry corresponds to a memory block, wherein the entry includes segments of the memory block. Further, the embodiment includes determining a demand segment of the segments in the entry, the demand segment corresponding to a segment of the memory block that includes the first line, reading a first field in the demand segment to determine if a second line in the demand segment is spatially related with respect to accesses of the demand segment and reading a second field in the demand segment to determine if a second segment in the entry is temporally related to the demand segment.

20 Claims, 6 Drawing Sheets

(56) References Cited

U.S. PATENT DOCUMENTS

| | | | |
|---|---|---|---|
| 7,716,424 | B2 | 5/2010 | Franaszek et al. |
| 8,347,036 | B2* | 1/2013 | Cargnoni et al. ............ 711/118 |
| 2005/0114289 | A1* | 5/2005 | Fair .................................. 707/1 |
| 2008/0147990 | A1* | 6/2008 | Pesavento et al. ............ 711/145 |
| 2008/0155226 | A1* | 6/2008 | Davis et al. ................... 711/207 |
| 2008/0222343 | A1 | 9/2008 | Veazey et al. |
| 2008/0244187 | A1* | 10/2008 | Bell et al. ...................... 711/136 |
| 2011/0238920 | A1* | 9/2011 | Hooker et al. ................ 711/136 |
| 2012/0072671 | A1 | 3/2012 | Chirca et al. |
| 2012/0084497 | A1 | 4/2012 | Subramaniam et al. |
| 2012/0137074 | A1 | 5/2012 | Kim et al. |
| 2012/0166733 | A1* | 6/2012 | Cherukuri et al. ............ 711/137 |
| 2013/0254485 | A1 | 9/2013 | Kannan et al. |

OTHER PUBLICATIONS

Prvulovic, Milos; Marinov, Darko; Dimitrijevic, Zoran;, Milutinovic, Veljko. "The Split Spatial/Non-Spatial Cache: A Performance and Complexity Evaluation." IEEE TCCA Newsletters, 1999.*

Gonzalez, Antonio; Aliagas, Carlos; Valero, Mateo. "A Data Cache with Multiple Caching Strategies Tuned to Different Types of Locality." ICS '95 Proceedings of the 9th International Conference on Supercomputing. pp. 338-347.*

Sanchez, Jesus; Gonzales, Antonio. "A Locality Sensitive Multi-Module Cache with Explicit Management." ICS '00 Proceedings of the 13th International Conference on Supercomputing. pp. 51-59.*

Rivers et al. "Reducing conflicts in direct-mapped caches with a temporality-based design." Proceedings of the 1996 International Conference on Parallel Processing, 1996. vol. 3. Software. 1996. vol. 1. pp. 154-163.*

U.S. Appl. No. 13/523,589, filed Jun. 14, 2014; Non-Final Office Action received dated Apr. 11, 2014; 87 pages.

S. Somogyi, et al., "Spatial Memory Streaming," In Proceedings of the 33rd Annual International Symposium on Computer Architecture, Jun. 2006; pp. 1-12.

Chen, Chi F., "Accurate and Complexity-Effective Spatial Pattern Predication", http://www.ece.cmu.edu; pp. 1-12.

M. Ferdman, et al., "Proative Instruction Fetch", In the Proceeding of the 44th Annual IEEE/ACM International Symposium on Microarchitecture, 2011; pp. 11.

Somogyi, Stephen, et al., "Spatio-Temporal Memory Streaming", In Proceedings of the 36th International Symposium on Computer Architecture, Jun. 2009; pp. 12.

\* cited by examiner

CACHE MEMORY PREFETCHING

CROSS-REFERENCE TO RELATED APPLICATION

This application is a continuation of U.S. patent application Ser. No. 13/523,589, filed Jun. 14, 2012, the content of which is incorporated by reference herein in its entirety.

BACKGROUND

The present invention relates to computer architecture and, more specifically, to prefetch processes for accessing cache in a computer.

In processing systems such as computers, the data to be utilized by a processor is stored in a memory (e.g., main memory, lower level memory, where lower level cache/memory is deemed closer to the processor and higher level cache/memory levels are deemed further away from the processor) and control logic manages the transfer of data between the memory and the processor in response to requests issued by the processor. The data stored in the main memory generally includes both instructions to be executed by the processor and data to be operated on by the processor. For simplicity, both instructions and operand data are referred to collectively herein as "data" unless the context requires otherwise. The time taken by a main memory access is relatively long in relation to the operating speeds of modern processors. To address this, a cache memory with a shorter access time is generally interposed between the main memory and the processor, and the control logic manages the storage of data retrieved from the main memory in the cache and the supply of data from the cache to the processor.

In embodiments, a cache is organized into multiple data units, such as "lines", each line providing storage for bits of data from the main memory which may be many bytes in length. When the processor issues a request for data contained in a particular line in a page, or block, of main memory, the control logic determines whether that line is stored in the cache. If the line is stored in cache (i.e., there is a cache hit), the data is retrieved from the cache. If the line is not stored in cache (i.e., there is a cache miss), the data is retrieved from the main memory and the processor's operations dependent on this cache access are stalled while this operation takes place. Since a cache access is much faster than a lower level memory access, it is desirable to manage the system so as to achieve a high ratio of cache hits to cache misses. In some embodiments, multiple levels of cache are provided, where if a cache miss occurs on a first level, the processor attempts to retrieve data from a second level before accessing the main memory. In such embodiments, cache misses occur each time a line is not present in a given cache level, thus also resulting in a performance degradation.

SUMMARY

According to exemplary embodiments, a computer program product, system, and method for prefetching in memory include determining a missed access request for a first line in a first cache level and accessing an entry in a prefetch table, wherein the entry corresponds to a memory block, wherein the entry includes segments of the memory block. Further, the embodiment includes determining a demand segment of the segments in the entry, the demand segment corresponding to a segment of the memory block that includes the first line, reading a first field in the demand segment to determine if a second line in the demand segment is spatially related with respect to accesses of the demand segment and reading a second field in the demand segment to determine if a second segment in the entry is temporally related to the demand segment.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
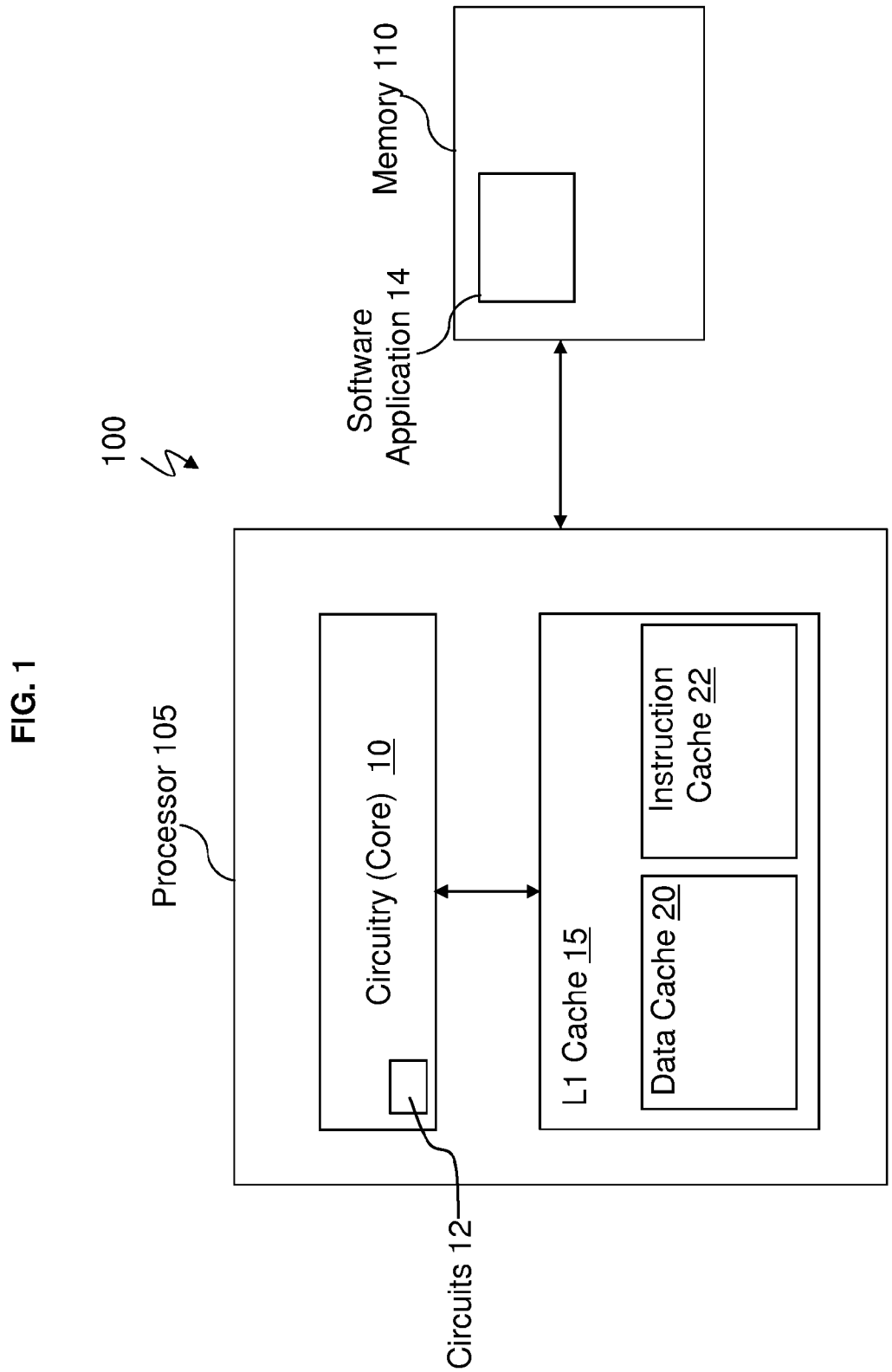
FIG. 1 illustrates a block diagram of a computing system for storing and retrieving data in a memory in accordance with an embodiment.

Embodiments provide a method, system and computer program product to improve prefetching of data from memory into a computer system cache. An embodiment provides information relating to "temporal locality in a spatial region" and "spatial locality in a temporal region" in a single prefetch storage container, such as a table or array. By utilizing a single prefetch storage container, the physical area on the chip utilized for the arrangement is reduced while less power is used due to reduced accesses to the storage container. Further, in an embodiment, lower latency is provided by acquiring results from the storage container by doing a single table lookup versus multiple table lookups. In some cases multiple table lookups would be required if each temporal reference was linked to a single other temporal locality, independent of any reference to associated spatial data which is typical an independent table lookup.

In an embodiment, data prefetch instructions in the table include information about the relation or locality of expected accesses to prefetched memory. Such information can be used to move/copy or "prefetch" the related data into a relatively higher cache level where it will be available for future accesses, thus providing improved memory performance. An inclusive cache would copy data and an exclusive cache would move data. Prefetched data that is proximate the data being accessed ("demand data" or "demand unit"), such as neighboring elements or lines in the main memory or a lower level cache, is considered to be spatially related if the data is frequently accessed in the particular segment of memory, such as a memory block. For example, each time any data in a memory block is accessed, three specific data lines in the same memory block are usually accessed, thus the three specific data lines are prefetched when a line is copied or moved into a level of cache based on the spatial relation. For purposes of explanation, the term demand unit may refer to the concept that a demand unit, such as a line or segment of a memory block being accessed is the particular element being requested by the processor. Thus, in embodiments, a relation between a variety of data types and sizes may be utilized for prefetching, where the data types may be lines within memory blocks. Data with temporal relation to a demand unit is expected to be accessed based on recent or historical accesses to the demand unit in memory and thus are prefetched to provide data that is typically referenced as a function of the demand unit that is accessed. For example, given two lines of data, X and Y, in memory whenever X is accessed, Y is also accessed independent of the spatial locality of X and Y. When Y is accessed as a demand however, X is not typically accessed. As per the given example, Y is temporally associated with X, but X is not temporally associated with Y. Furthermore, the two are not spatially correlated. In an example, a spatial correlation would state whenever X is accessed Y is also accessed and when Y is accessed, X is also accessed due to their proximity to one another.

Turning now to FIG. 1, a block diagram of a system 100 is shown according to an embodiment. The system 100 includes a processor 105. The processor 105 has one or more processor cores, and the processor core may be referred to as circuitry 10 including circuits 12. The processor 105 may include a level one (L1) cache 15. Although an L1 cache is shown, exemplary embodiments may be implemented in any suitable cache, such as L1 cache, L2 cache and L3 cache, as desired, where L1 cache is closer to core circuitry 10 than L2. By virtue of being closer to the circuitry 10, L1 cache provides a faster response time than L2 cache. Accordingly, in general terms, L(N−1) cache may be considered higher level cache in memory hierarchy than L(N) cache. The L1 cache 15 includes an L1 data cache 20 (D-cache) and an L1 instruction cache 22 (I cache). The data cache 20 is on-processor (hardware) memory for caching (i.e., storing and retrieving) data on the processor 105. Data retrieved from main memory 110 may be cached in the data cache 20 while instructions of program code 115 retrieved from the main memory 110 may be cached in the instruction cache 22 (e.g., on-processor hardware memory). Embodiments of the prefetching process may occur in the data cache 20 and/or instruction cache 22.

The circuits 12 may be application specific integrated circuits (ASIC), field programmable gate arrays (FPGA), etc. Also, the logic of the circuits 12 may be implemented as software code illustrated as a software application 14 in one implementation. Any reference to the functions, logic, and features for the circuits 12 applies to the software application 14 as understood by one skilled in the art. In embodiments, data or information is prefetched into a cache level from main memory 110 or from a lower level cache to improve performance. The prefetching process may be implemented by a cache controller, such as the processor 105 or a higher level cache (i.e., closer to the processor 105 than the cache receiving the prefetch). By prefetching data into a cache level that is closer to the processor 105 than its previous location, the prefetched data will be available in the closer cache for future access requests, reducing missed requests, improving performance and reducing latency.

Figure 2:
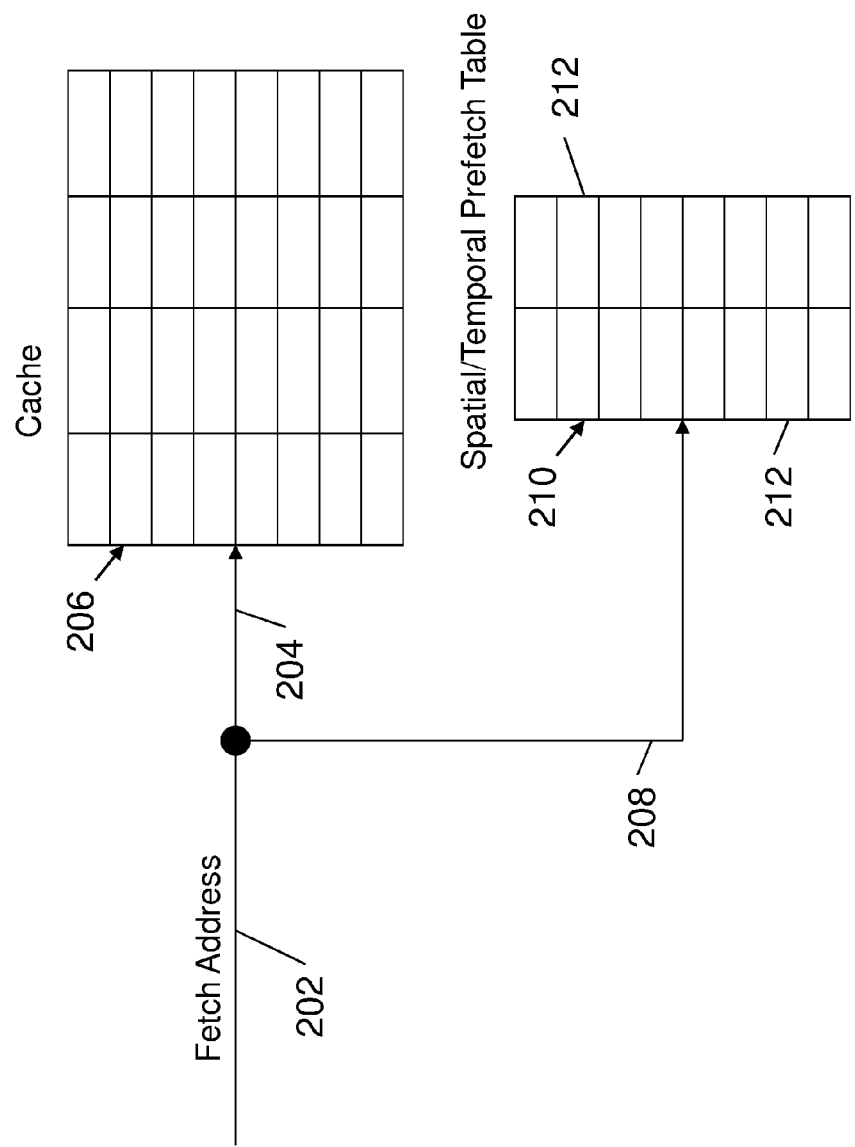
FIG. 2 illustrates a diagram of part of a system for prefetching data from memory, including a cache and a prefetch table, in accordance with an embodiment.

Referring now to FIG. 2, a diagram of an embodiment of a method, system and computer program product for managing memory using a prefetching arrangement is shown. As depicted, an access request 202 includes an instruction fetch address that is received as access 204 by a cache 206. The cache 206 may be an L1 cache, L2 cache or any suitable cache located on or off the processor 105 (FIG. 1) chip, where data is prefetched to the cache 206 from memory or a lower level cache. In an embodiment, if the data at the requested address is not present in cache 206, a miss occurs, causing the processor 105 to access the data from a lower level cache or main memory 110. In an embodiment, following the miss, an access request 208 is communicated to a prefetch table 210 or storage container to determine if related data is to be prefetched along with the data to be accessed by request 208. Entries 212 in the prefetch table 210 each correspond to a memory block where the table represents a region of memory which has a larger footprint that the level of cache that encountered a miss. The number of entries 212 in the prefetch table may vary, where the table may be 2, 3, 4 or N dimensional. As depicted, 16 entries are shown, where the entries correspond to 16 memory blocks of the main memory or lower level cache that have prefetch information stored in the prefetch table 210. In embodiments, the total number of memory blocks in the architecturally defined addressing space and/or lower level caches exceeds the number of entries 212, therefore, only a selected number of blocks have prefetch information stored in the prefetch table 210.

In one embodiment, the prefetch table 210 is accessed in parallel (e.g., substantially at the same time) with the cache 206, where the access request 208 will proceed with prefetching only if a miss occurs in cache 206, thereby providing a faster response to the request. In another embodiment, the prefetch table 210 is accessed only if the access 204 leads to a miss, thus conserving power.

Figure 3:
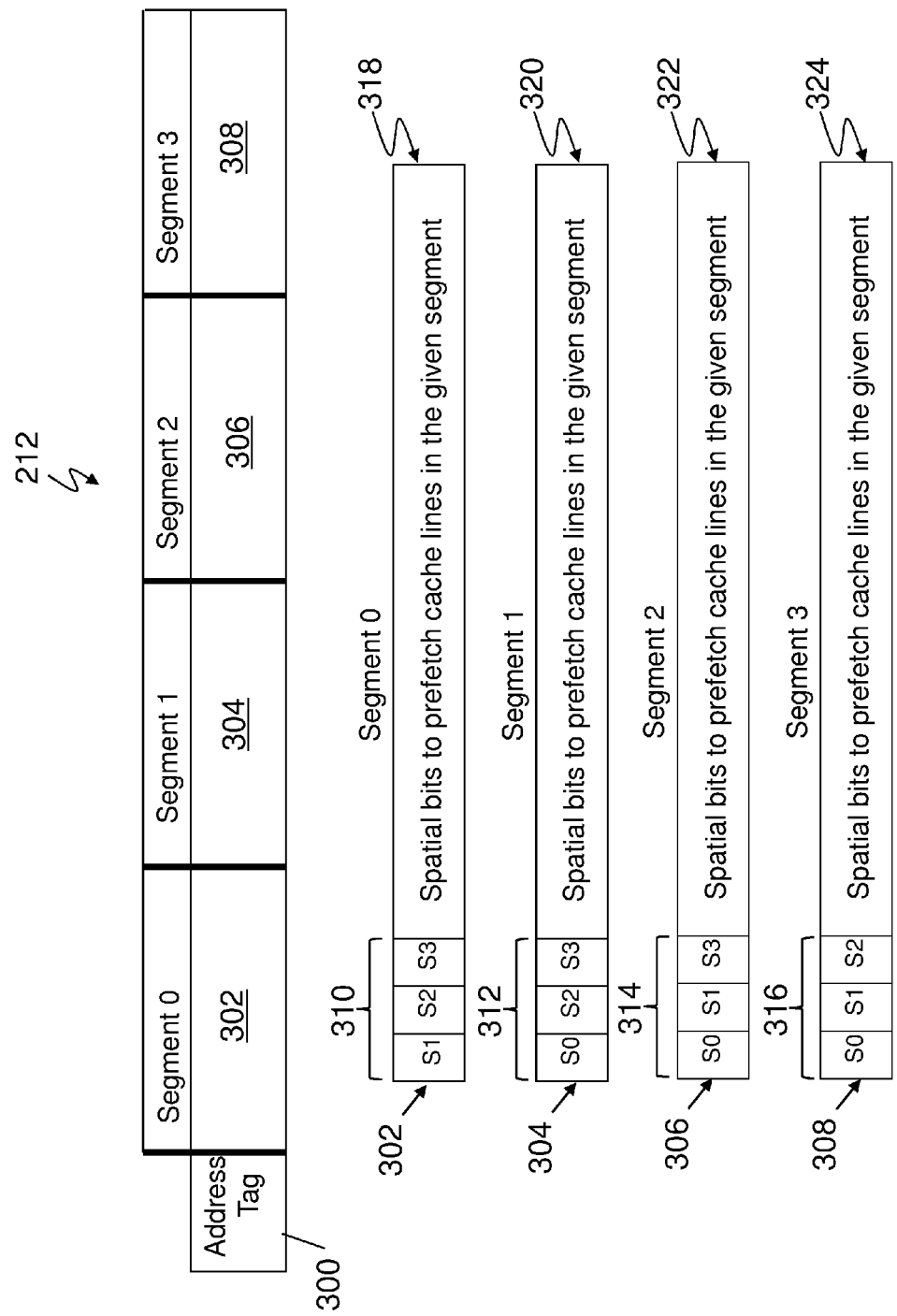
FIG. 3 illustrates a detailed diagram of an entry from the prefetch table of FIG. 2 in accordance with an embodiment.

FIG. 3 shows an exemplary embodiment of a diagram of the entry 212 in prefetch table 210 shown in FIG. 2. The entry 212 corresponds to a memory block of a lower level memory than cache 206, such as lower level cache and/or main memory. The entry 212 includes an address tag 300, segment 302, segment 304, segment 306 and segment 308, where each segment corresponds to a segment of the memory block and the entire block is represented by the segments, 300, 302, 304, 306, 308. The memory block may be divided into any suitable number of segments for desired performance, such as 2, 3, 4, 8, 16 or more segments. For example, a main memory of 1 megabyte may be divided into 256 blocks of 4 kilobytes each, where each block corresponds to an entry. As depicted, the entry 212 has four segments that each represent a quartile ($\frac{1}{4}^{th}$) of the memory block corresponding to the entry. The address tag may use any number of bits to refer to the memory block being described in the entry 212. Diagrams showing details of each of the segments 302, 304, 306, 308 are shown below the entry 212. Specifically, segment 302 includes a temporal field 310 and a spatial field 318. Similarly, segment 304 includes a temporal field 312 and a spatial field 320; segment 306 includes a temporal field 314 and a spatial field 322; and segment 308 includes a temporal field 316 and a spatial field 324. The temporal fields 310, 312, 314, 316 describe a temporal relation between the particular segment and other segments. For example, within segment 302, temporal field 310 describes the temporal relation of segment 304 (segment 1 or "S1"), segment 306 (segment 2 or "S2") and segment 308 (segment 3 or "S3") to segment 302 (segment 0 or "S0"). Similarly, within segment 304, temporal field 312 describes the temporal relation of segment 302 (segment 0 or "S0"), segment 306 (segment 2 or "S2") and segment 308 (segment 3 or "S3") to segment 304 (segment 1 or "S1"). Accordingly, the same temporal relationship for each segment is described in a respective temporal field of each segment. In addition, the number of entries in the temporal field will vary depending on the number of segments within the entry. In one embodiment, a bit at a particular location in the field indicates temporal relation to the segment by having a value of 1 if it is related and 0 if it is not related.

The spatial fields 318, 320, 322, 324 describe a spatial relation of units, such as lines, within the memory block segment. For example, a plurality of bits in field 318 may be used to describe which lines have been recently accessed when any line is accessed within the segment 302 of the memory block. Similarly, each spatial field in each segment of the entry 212 describes spatial relation of lines corresponding to recently accessed lines in the memory block segment.

One example of a prefetching process utilizing the prefetch table 210 and entry 212 is now described. A processor issues access request for a selected line that causes a miss in the cache 206. The miss leads to a determination of whether the entry 212 in the prefetch table 210 corresponds to the memory block that includes the selected line that caused the miss. Upon determining that the entry 212 corresponds to the memory block with the selected line, the segment 304 of the memory block including the selected line is determined. In an embodiment, the segment 304 with the selected line is referred to as the demand segment. Accordingly, the field 320 of the demand segment 304 is read to determine if there are any spatially related lines with respect to recent accesses of the demand segment 304. The field 320 may indicate that anywhere from zero to a plurality of lines in the segment are spatially related. Further, field 312 is read to determine if segments 302, 306 or 308 are temporally related with respect to accesses of the demand segment 304. If segment 308 is indicated as temporally related to accesses of the demand segment 304, the field 324 of segment 308 is read to determine spatial relation of lines within the segment 308 with respect to recent accesses of the segment 308. For the temporally related segment 308, the field 316 is not read, as temporal relation of segments is only relevant information for the demand segment including the selected line. In embodiments, the field 312 may indicate that zero to three segments are temporally related to the segment 304. Further, each temporally related segment may have zero to plurality of spatially related lines in each segment. The lines read as spatially or temporally related are then prefetched when accessing the selected line from memory.

Figure 4:
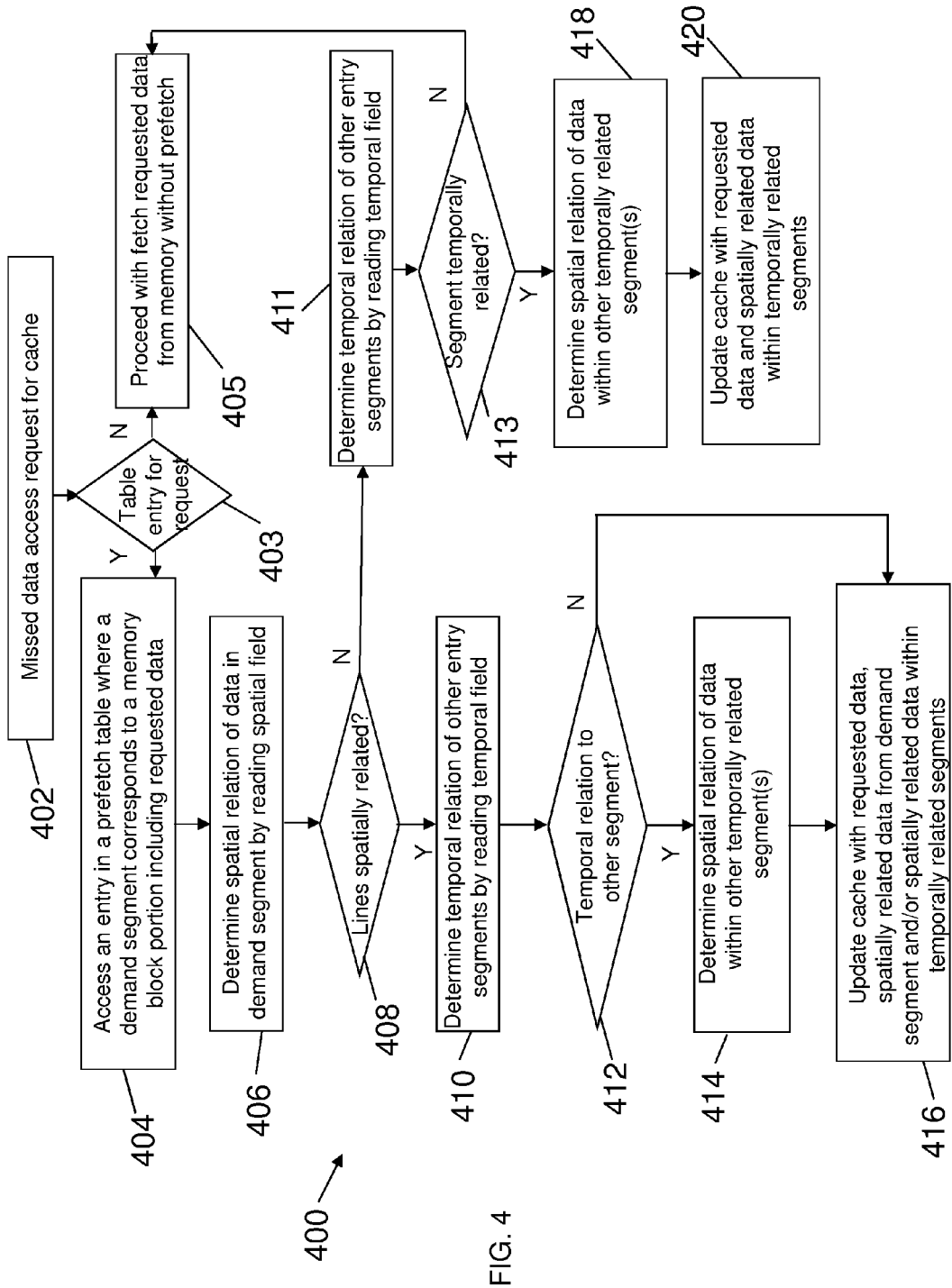
FIG. 4 illustrates a flow diagram of a method for prefetching data in accordance with an embodiment.

FIG. 4 is a flow chart of an exemplary process for prefetching data during access requests for a cache. The depicted blocks may be part of, or in addition to, another process and/or may be performed in any suitable order to provide prefetching to improve computing system performance. In an embodiment, the actions described in the blocks are performed by a cache controller, such as a processor and/or a cache level higher than that which is prefetching the data. In block 402, an occurrence of a missed access data request for a selected cache, such as an L1 or L2 cache, is determined. In block 403, it is determined if a entry for the missed request exists in a prefetch table. If an entry in the table does not correspond to a memory block having the requested data, then the cache controller fetches the requested data in block 405. In block 404, the entry is located in the prefetch table and is accessed, either in parallel to the cache access or subsequent to the miss, to determine related data (e.g., memory lines) to fetch along with the requested data. Specifically, in some embodiments, the prefetch table is accessed for each cache access. In other embodiments, the prefetch table is only accessed following a cache access yielding a miss. The prefetch tables include a plurality of entries that each correspond to a block of memory. If an entry in the prefetch table does correspond to the memory block containing the requested data, then information in the entry is read to enable prefetching of related data. Accordingly, in block 406, the cache controller reads a field in the entry to determine spatially related data, such as line(s), within a segment of the memory block containing the requested data. In an embodiment, the entry includes a "demand segment" as well as other segments of the memory block. In block 408, information, such as bits, in the spatial field describes spatially related data, such as lines, within the demand segment. In block 410, the cache controller reads a field in the entry to determine if any of the other segments are temporally related to the demand segment. In block 412, information, such as bits, in the temporal field describes if there are temporally related segments relative to the demand segment. In block 414, the cache controller reads a field within each temporally related segment that describes spatially related data within each segment. In block 416, the requested data along with spatially related data in the demand segment and spatially related data within the temporally related segments are fetched into the cache, thereby updating the cache with relevant prefetch data. Further, if block 412 provides that there are no temporally related segments to the demand segment, the process advances to block 416, where the requested data and spatially related data in the demand segment are fetched.

If there is no spatially related data described in the spatial field, block 408 proceeds to block 411, where the cache controller reads a field in the entry to determine if other segments are temporally related to the demand segment. If there are no temporally related segments, the process advances to block 405 to fetch the requested demand data. If there are temporally related segment(s), in block 418, a field is read within each temporally related segment that describes spatially related data within each segment. In block 420, the requested data along with spatially related data within the temporally related segments are fetched into the cache, thereby updating the cache with relevant prefetch data.

An entry 212 in the prefetch table 210 may be written or updated by any suitable process. In an example, upon entering a new memory block, a reference is made to the prefetch table to determine if content exists in the table for the memory block. If content exist, that content is copied to a local latch for processing/updating. Content that was in the latch from the prior memory block is copied back into (i.e. updates) the prefetch table in the scenario that content was initially loaded into the latch from the prefetch table. If content was not available from the prefetch table then the content that is copied (i.e. installed) into the prefetch table is to replace existing content in the table of a different entry. A typical replacement policy is to replace the set of data per the given index that was least recently used.

An example of tracking of spatial and temporal references is as follows. The cache line that causes a different memory block to be referenced is known to be in the demand segment. The demand segment, per FIG. 3, is either 302, 304, 306, or 308. Prior to moving to another memory block, for each cache line accessed, the appropriate segment bit (318, 320, 322, 324) is set to a '1'. Only the quartile bits (310, 312, 314, 316) of the demand segment may be set and they are set with respect to which additional segments are referenced prior to going to another memory segment. In one embodiment of the system, the quartile/temporal bits and spatial bits are each represented by a single bit.

In one embodiment, the spatial and temporal fields for the demand segment include spatial bits and temporal bits may each be represented by a 2-bit saturating counter. The two bit saturating counter is a counter that increments from a value of 00, to 01, to 10, to 11. At a value 11 and an increment, the counter saturates at 11. The decrement occurs from value 11, to 10, to 01, to 00. At value 00 and a decrement, the counter saturates at 00. On any cache line reference, the line that is referenced has its spatial value incremented by 1. The temporal/segment bits of the demand segment are also incremented by 1 for any other segments that are referenced. In the demand segment, any other segments which are not referenced have the associated temporal/segment bit decremented by 1. Furthermore, only the spatial bits associated with cache lines within the demand segment that are not referenced are also decremented by a value of 1. Accordingly, an entry corresponding to a segment may be updated as described herein, in one embodiment.

Figure 5:
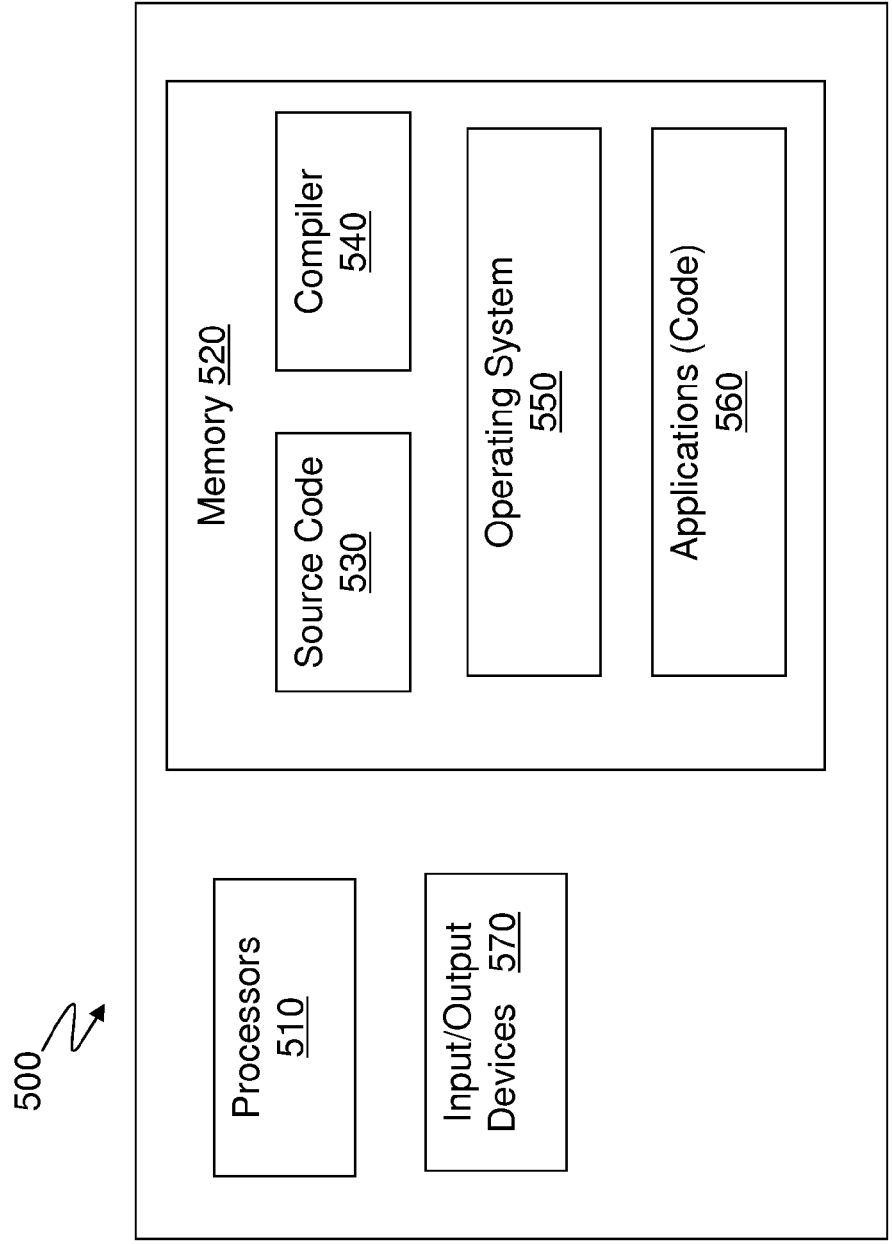
FIG. 5 illustrates an example of a computer having capabilities, which may be utilized in accordance with an embodiment.

FIG. 5 illustrates an example of a computer 500 having capabilities, which may be included in exemplary embodiments. Various methods, procedures, modules, flow diagrams, tools, application, circuits, elements, and techniques discussed herein may also incorporate and/or utilize the capabilities of the computer 500. Moreover, capabilities of the computer 500 may be utilized to implement features of exemplary embodiments discussed herein. One or more of the capabilities of the computer 500 may be utilized to implement, to connect to, and/or to support any element discussed herein (as understood by one skilled in the art) in FIGS. 1-4 and 6.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application(s) 560 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 520 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
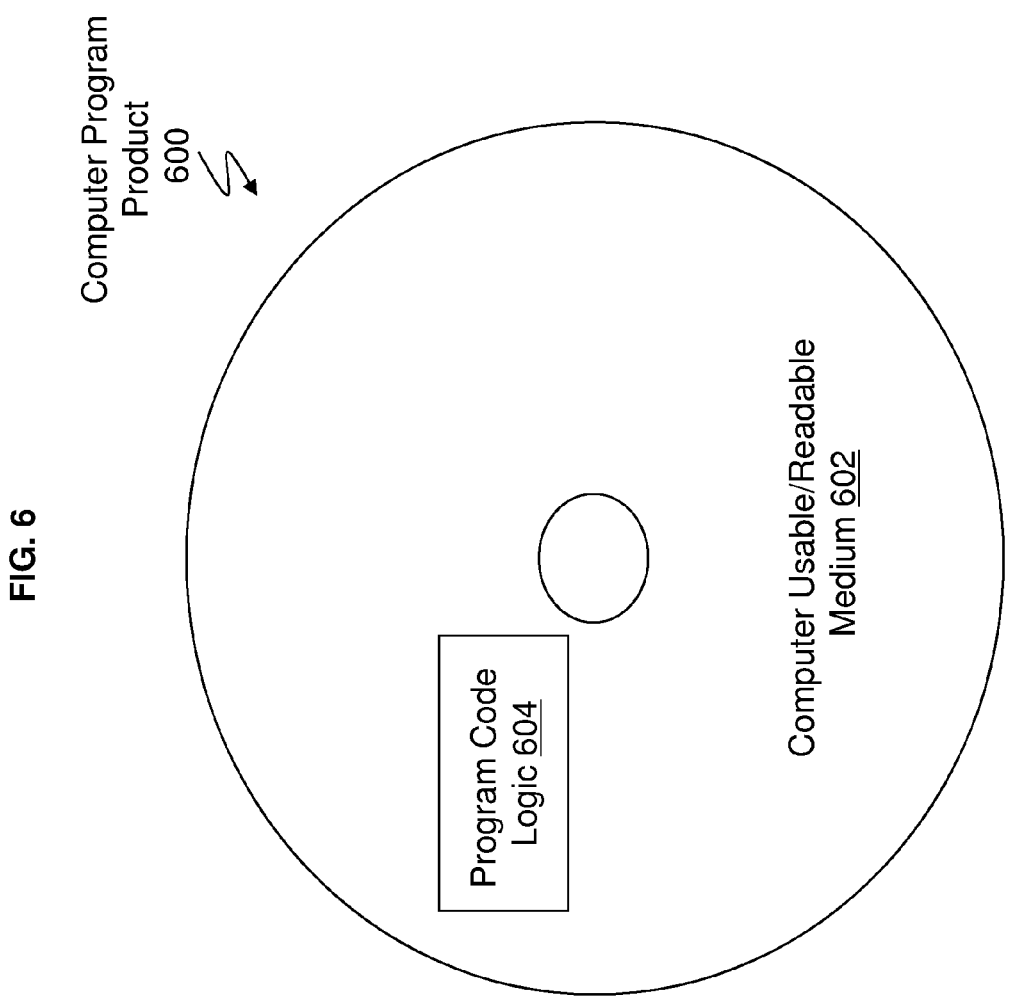
FIG. 6 illustrates an example of a computer program product on a computer readable/usable medium with computer program code logic embodied in tangible media as an article of manufacture.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

According to exemplary embodiments, a computer program product, system, and method for prefetching in memory include determining a missed access request for a first line in a first cache level and accessing an entry in a prefetch table, wherein the entry corresponds to a memory block, wherein the entry includes segments of the memory block. Further, the embodiment includes determining a demand segment of the segments in the entry, the demand segment corresponding to a segment of the memory block that includes the first line, reading a first field in the demand segment to determine if a second line in the demand segment is spatially related with respect to accesses of the demand segment and reading a second field in the demand segment to determine if a second segment in the entry is temporally related to the demand segment.

In an embodiment, the method also includes reading a first field in the second segment to determine if a third line in the second segment is spatially related with respect to accesses of the second segment, the reading of the first field in the second segment based on a determination that the second segment is temporally related to the demand segment.

In an embodiment, the method also includes prefetching, by the cache controller, at least one of the second line and the third line during a fetch of the first line from a second cache level or main memory.

In an embodiment, the memory block includes a block of main memory or a lower level cache that is further from a processor than the first cache level.

In an embodiment, accessing the entry in the prefetch table occurs each time an access request is received by the first cache level.

In an embodiment, the cache controller includes a cache controller of a lower level cache which encountered a miss, as well as a processor or higher level cache than the cache level.

In an embodiment, accessing the entry in the prefetch table includes accessing an entry with a selected number of segments, wherein an entirety of the memory block is represented by the selected number of segments.

In an embodiment, the reading, by the cache controller, the first field in the demand segment includes reading a first field including bits, each bit corresponding to one of the segments, each bit being configured to indicate a line is spatially related to the first line. In addition, the reading, by the cache controller, the second field in the demand segment includes reading a second field comprising bits, each bit corresponding to one of the segments, each bit being configured to indicate if a segment is temporally related to the demand segment.

In an embodiment, the reading, by the cache controller, the first field in the demand segment to determine if the second line in the demand segment is spatially related with respect to accesses of the demand segment includes determining if the second line has been accessed recently when accessing a line in the demand segment. In addition, the reading, by the cache controller, the second field in the demand segment to determine if the second segment in the entry is temporally related to the demand segment includes determining if a second segment of the memory block has been recently accessed when accessing the memory block corresponding to the demand segment.

Technical effects and benefits include improved prefetching of data from memory into a computer system cache. An embodiment provides information relating to "temporal locality in a spatial region" and "spatial locality in a temporal region" in a single prefetch storage container, such as a table or array. By utilizing a single prefetch storage container, the physical area on the chip utilized for the arrangement is reduced while less power is used due to reduced accesses to the storage container. Further, in an embodiment, lower latency is provided by acquiring results from the storage container by doing a single table lookup versus multiple table lookups. In an embodiment, data prefetch instructions in the table include information about the relation or locality of expected accesses to prefetched memory. Such information can be used to move/copy or "prefetch" the related data into a relatively higher cache level where it will be available for future accesses, thus providing improved memory performance.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for prefetching in memory, the computer program product comprising:
   a tangible non-transitory storage medium readable by a processing circuit and storing instructions for execution by the processing circuit for performing a method comprising:
   determining a missed access request for a first line in a first cache level;
   accessing an entry in a prefetch table, the entry corresponding to a memory block and comprising segments of the memory block, the segments of the memory block comprising a demand segment and a plurality of other segments of the memory block, each of the segments of the memory block comprising a respective plurality of lines;

determining the demand segment of the segments in the entry, the demand segment corresponding to a segment of the memory block that includes the first line;

reading, by a cache controller, a first field in the demand segment to determine if whether a second line in the demand segment is spatially related with respect to accesses of the demand segment; and reading, by the cache controller, a second field in the demand segment to determine whether a second segment in the entry is temporally related to the demand segment, wherein the second field comprises one of a plurality of temporal relation fields of the demand segment, wherein each of the plurality of temporal relation fields of the demand segment corresponds to a single respective segment of the plurality of other segments, and indicates whether the demand segment is temporally related to the temporal relation field's respective segment of the plurality of other segments.

2. The computer program product of claim 1, comprising reading a first field in the second segment to determine if whether a third line in the second segment is spatially related with respect to accesses of the second segment, the reading of the first field in the second segment being performed based on determining, based on reading the second field in the demand segment, that the second segment is temporally related to the demand segment.

3. The computer program product of claim 2, comprising prefetching, by the cache controller, at least one of the second line and the third line during a fetch of the first line from a second cache level or main memory.

4. The computer program product of claim 1, wherein the memory block comprises a block of main memory or a lower level cache that is further from a processor than the first cache level.

5. The computer program product of claim 1, wherein accessing the entry in the prefetch table occurs each time an access request is received by the first cache level.

6. The computer program product of claim 1, wherein the cache controller comprises a cache controller of the first cache level which encountered a miss, the cache controller further comprising a processor or higher level cache than the first level cache.

7. The computer program product of claim 1, wherein accessing the entry in the prefetch table comprises accessing an entry with a selected number of segments, wherein an entirety of the memory block is represented by the selected number of segments.

8. The computer program product of claim 1, wherein reading, by the cache controller, the first field in the demand segment comprises reading a first field comprising bits, each bit corresponding to one of the segments, each bit being configured to indicate a line is spatially related to the first line.

9. The computer program product of claim 1, wherein reading, by the cache controller, the first field in the demand segment to determine if whether the second line in the demand segment is spatially related with respect to accesses of the demand segment comprises determining if the second line has been accessed recently when accessing a line in the demand segment; and wherein reading, by the cache controller, the second field in the demand segment to determine whether the second segment in the entry is temporally related to the demand segment comprises determining if a second segment of the memory block has been recently accessed when accessing the memory block corresponding to the demand segment.

10. The computer program product of claim 1, wherein the second line in the demand segment being spatially related with respect to accesses of the demand segment comprises the second line being expected to be accessed based on an access to the first line, wherein the first line is expected to be accessed based on an access to the second line, and the first line is spatially related to the second line.

11. The computer program product of claim 1, wherein the second segment being temporally related to the demand segment comprises the second segment being expected to be accessed based on an access to the demand segment, and wherein the demand segment is not temporally related to the second segment and is not expected to be accessed based on an access to the second segment.

12. The computer program product of claim 1, wherein each of the segments of the memory block comprise a respective plurality of temporal relation fields corresponding to another respective segment of the memory block.

13. A method for prefetching in memory, the method comprising:

determining a missed access request for a first line in a first cache level;

accessing an entry in a prefetch table, wherein the entry corresponds to a memory block, wherein the entry comprises segments of the memory block, the segments of the memory block comprising a demand segment and a plurality of other segments of the memory block, each of the segments of the memory block comprising a respective plurality of lines;

determining the demand segment of the segments in the entry, the demand segment corresponding to a segment of the memory block that includes the first line;

reading a first field in the demand segment to determine if whether a second line in the demand segment is spatially related with respect to accesses of the demand segment; and reading a second field in the demand segment to determine whether a second segment in the entry is temporally related to the demand segment, wherein the second field comprises one of a plurality of temporal relation fields of the demand segment, wherein each of the plurality of temporal relation fields of the demand segment corresponds to a single respective segment of the plurality of other segments, and indicates whether the demand segment is temporally related to the temporal relation field's respective segment of the plurality of other segments.

14. The method of claim 13, the method further comprising reading a first field in the second segment to determine whether a third line in the second segment is spatially related with respect to accesses of the second segment, the reading of the first field in the second segment being performed based on determining, based on reading the second field in the demand segment, that the second segment is temporally related to the demand segment.

15. The method of claim 14, the method further comprising prefetching, by the cache controller, at least one of the second line and the third line during a fetch of the first line from a second cache level or main memory.

16. The method of claim 13, wherein the memory block comprises a block of main memory or a lower level cache that is further from a processor than the first cache level.

17. The method of claim 13, wherein reading the first field in the demand segment comprises reading a first field comprising bits, each bit corresponding to one of the segments, each bit being configured to indicate a line is spatially related to the first line.

18. The method of claim 13, wherein reading the first field in the demand segment to determine whether the second line in the demand segment is spatially related with respect to accesses of the demand segment comprises determining if the second line has been accessed recently when accessing a line in the demand segment; and wherein reading the second field in the demand segment to determine if the second segment in the entry is temporally related to the demand segment comprises determining whether a second segment of the memory block has been recently accessed when accessing the memory block corresponding to the demand segment.

19. The method of claim 13, wherein the second line in the demand segment being spatially related with respect to accesses of the demand segment comprises the second line being expected to be accessed based on an access to the first line, wherein the first line is expected to be accessed based on an access to the second line, and the first line is spatially related to the second line.

20. The method of claim 13, wherein the second segment being temporally related to the demand segment comprises the second segment being expected to be accessed based on an access to the demand segment, and wherein the demand segment is not temporally related to the second segment and is not expected to be accessed based on an access to the second segment.

* * * * *